Sept. 13, 1966 W. COOKSON 3,272,045
FLYING SHEAR
Filed Feb. 10, 1964
3 Sheets-Sheet 1
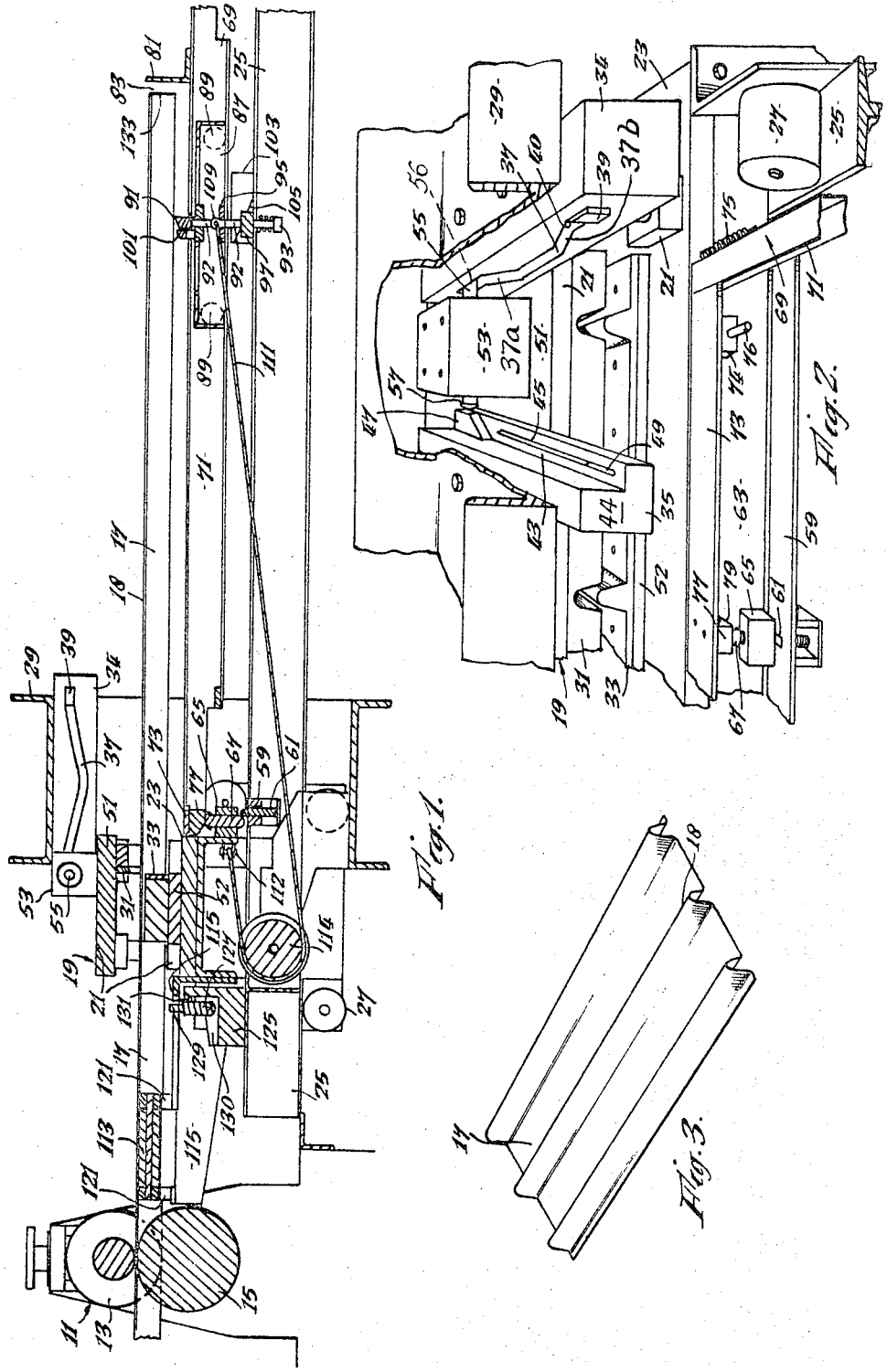

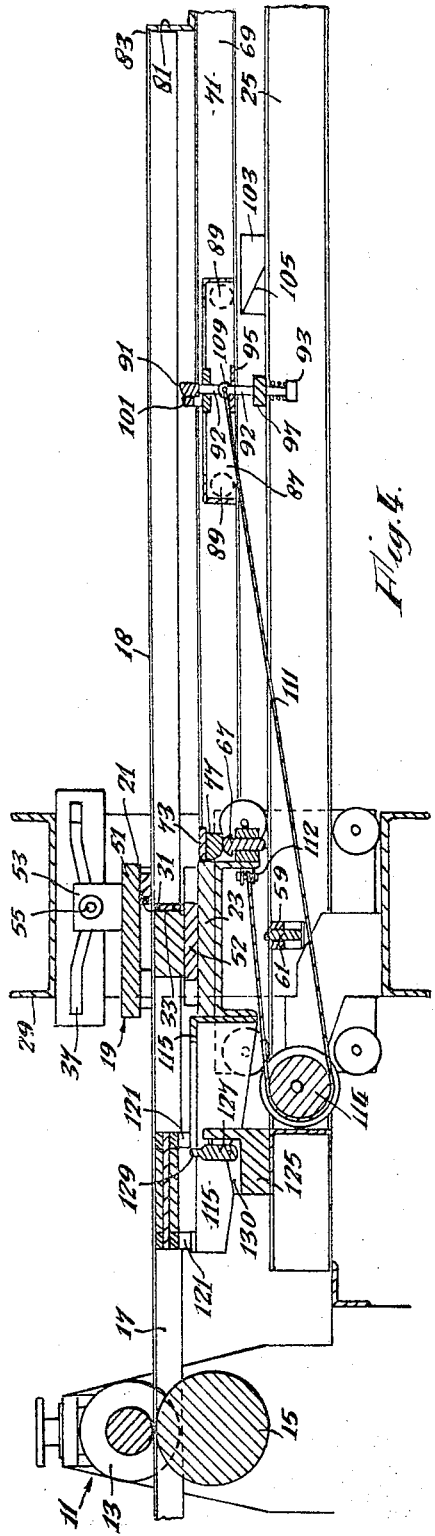
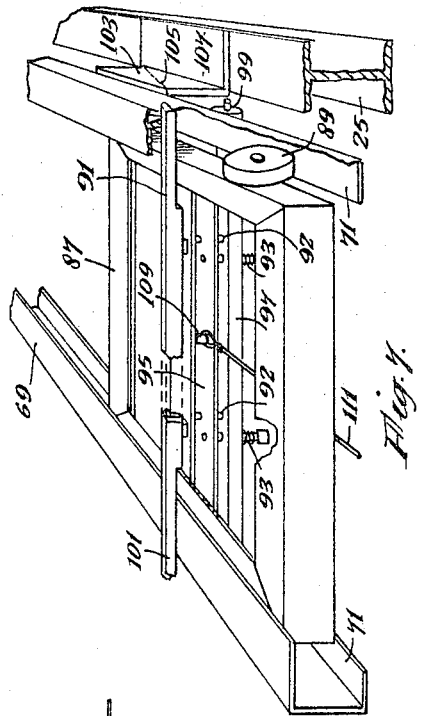
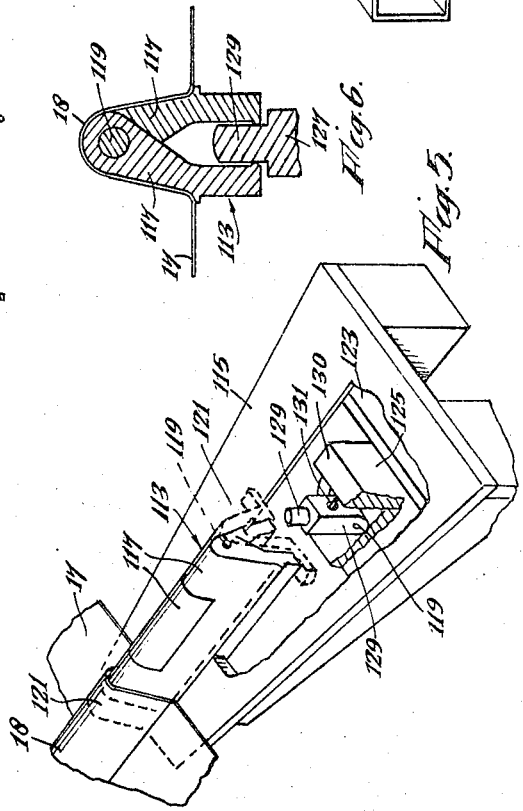

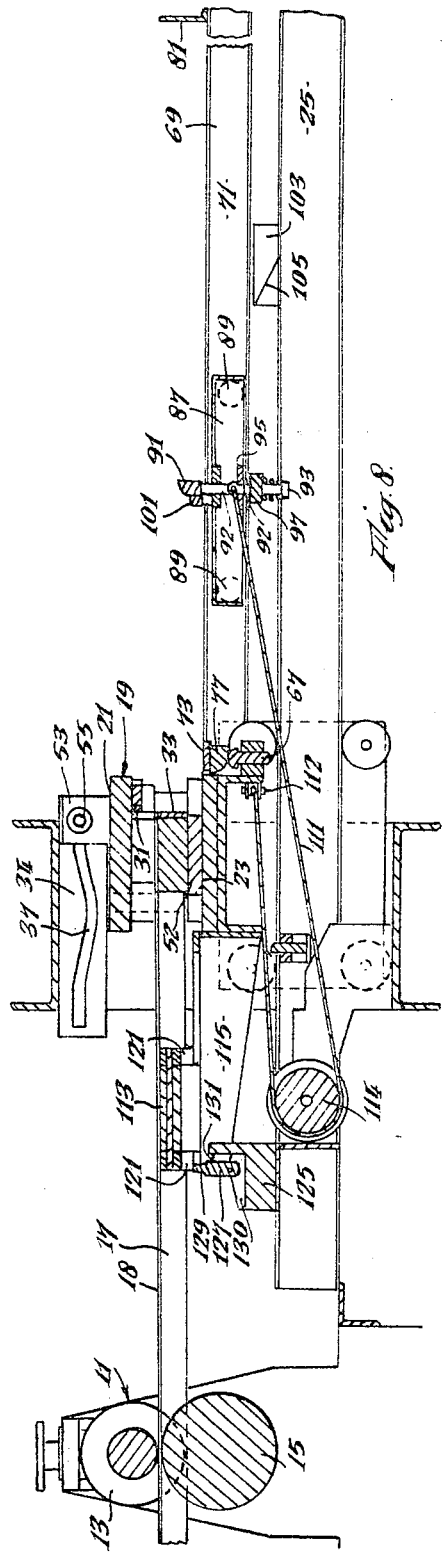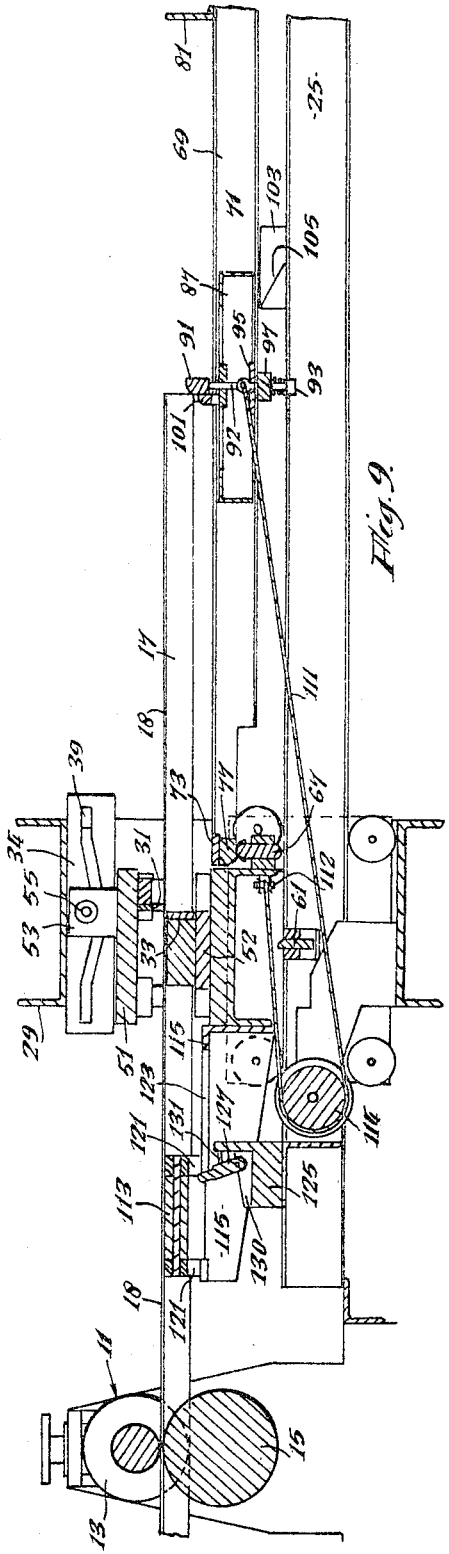

United States Patent Office 3,272,045
Patented Sept. 13, 1966

1

3,272,045
FLYING SHEAR
William Cookson, Southampton, England, assignor to Cookson Sheet Metal Developments Limited, Southampton, England, a company of Great Britain and Northern Ireland
Filed Feb. 10, 1964, Ser. No. 343,560
Claims priority, application Great Britain, Feb. 18, 1963, 6,539/63
16 Claims. (Cl. 83—308)

This invention relates to a flying shear for cutting into predetermined lengths a rigid or semi-rigid material in the form of ribbon, rod, tube or sheet. Such sheet may be plane or may be curved, angled or ribbed at one or more points in its cross section. Such material will be hereinafter referred to as "material of the kind described." The material of the kind described may be continuously produced from strip or coil in a roll forming machine.

Heretofore, as sheet material travels at speed out of a roll forming machine it passes through a cutter die of the same profile, mounted on a power operated die set which has limited forward and reverse movement. The sheet progresses along a run-out table until its front end contacts a trigger so set as to be released when the required length has run out. The trigger mechanism causes the die set to move forward with the sheet, the power operated cutter blade coming into operation, with the die set continuing its movement until the metal is severed. The die set is then retracted to its starting point, ready for another cut.

With this arrangement synchronisation of the power operated moving parts with the speed of the sheet as it travels through the die set is essential to obtain accurately cut off lengths, but this is often difficult to achieve particularly when the speed of operation of the roll forming machine is varied according to whether long lengths of sheet (which would be run at high speeds) or very short lengths (which would be run at slower speeds) are being cut.

According to the present invention, I provide a flying shear for cutting into predetermined lengths material of the kind described wherein, to effect cutting, shear blades, between which said material is made to pass, are caused by said material to move forward with said material leaving said predetermined length of material in front of the blades, and are caused to close together and open again during said forward movement.

In the preferred form of the invention the closing of the shear blades is effected by cam means one element of which is connected to a moving shear blade and the other element of which is on a fixed part of the device. In this way I can provide a flying shear which is actuated by the material which it cuts, eliminating separately powered mechanisms for moving the die set and actuating the cutter blades, and in consequence, problems of synchronisation. The forward and reverse movements of the die set and the operation of the cutter blades are proposed to be actuated solely by mechanisms which are caused to function by the movement of the metal sheet as it travels through the die set. As a consequence, the speed at which the metal sheet leaves the roll forming machine governs the speed at which the flying shear operates, the resulting synchronisation of speeds producing the desired consistently accurately cut off lengths of sheet.

Together with the increase in efficiency, the elimination of power operated devices would very considerably reduce costs in the manufacture, operation and maintenance of a flying shear. There would result, therefore, an efficient and economic shear for the accurate cutting, for example, of metal sheet, tubes, panels, or any similar materials which are made by a continuous rolling process.

2

One form of the invention in which is provided a flying shear for cutting profiled sheet metal material passing from a roll forming machine will be described by reference to the accompanying drawings in which:

FIG. 1 is a central longitudinal sectional elevation of a flying shear according to the invention prior to a length of sheet metal material being cut, part of the device being removed for the sake of clarity.

FIG. 2 is a fragmentary perspective view of the flying shear shown in FIG. 1 with parts shown cut away.

FIG. 3 is a fragmentary perspective view of a length of sheet metal material cut off by the flying shear.

FIG. 4 is a similar view to that shown in FIG. 1 with the shear blades in the closed position.

FIG. 5 is a detailed view of a gripping device, which forms a part of the flying shear, for gripping the material to be cut.

FIG. 6 is a cross-sectional view of the gripping device shown in FIG. 5 in its operative position.

FIG. 7 is a perspective view of a run out table and its associated return table which form parts of the flying shear.

FIG. 8 is a view similar to that shown in FIG. 1 with the shear blades in the open position at the end of their forward movement.

FIG. 9 is a view similar to that shown in FIG. 1 with the shear blades having completed one half of their reverse movement.

In FIG. 1, the last roll stand 11 of a roll forming machine has a pair of profiled rolls 13 and 15 through which continuously passes sheet metal material 17 having ribs 18, also shown in FIG. 3. Sheet metal material 17 is cut off to predetermined lengths in a shearing device 19. (FIGS. 1 and 2.) Shearing device 19 comprises a die set 21 mounted on a movable carriage 23 which travels on rails 25 by means of rollers 27. Carriage 23 has limited forward and return movement on rails 25 under a surrounding bridge 29 fixed to the rails and through which they pass.

In die set 21 are positioned moving cutter blade 31 on top platen 51 and fixed cutter blade 33 on bottom platen 52. Both blades are profiled to the ribs 18 of sheet metal 17. At each end of bridge 29 is provided a camming device comprising a pair of runway blocks facing each other, one such pair, 34, 35, being shown in FIG. 2. In FIGS. 1, 4, 8 and 9 the runway block 35 has been removed for clarity. Runway block 34 has a curved channel runway 37 providing a downwardly inclined first fixed cam element 37a and an upwardly inclined second fixed cam element 37b the vertical base of the channel leading out to a flat protuberance 39 at the front end of the runway block by means of a ramp 40 (see FIG. 2). Runway block 35 has a horizontal runway 43 provided with a cam rail 45 and a cam end piece 47, the whole providing a third fixed cam element 44. A front portion of rail 45 is separated from the remainder of rail 45 to provide a spring loaded rail latch 49. Positioned between blocks 34 and 35 and secured to the top platen 51 of die set 21 there is at each end of the platen 51 a cam block 53 in which a cam rod 55 has rotatable and slidable lateral movement. One end 56 of cam rod 55 provides a first cam element connected to the shear blade 31. The other end of the rod 55 has a rounded off shoulder 57 for engagement behind cam rail 45 and rail latch 49 thus providing a second cam element connected to the shear blade 31.

Referring to both FIGS. 1 and 2, a cross rail 59 is secured to rails 25 and is provided with a spring loaded latch device 61. Secured to the front face 63 of carriage 23 is a block 65 having a spring loaded plunger rod 67 the bottom end of which locates behind latch 61. A run-out table 69 having side rails of channel section 71 and an end rail 73 is slidably attached to face 63 of carriage 23 by two blocks 74 secured to rail 73 in which horizontal rods 76, which are fixed to face 63, can freely slide. The sliding movement is limited by side springs 75 and a stop (not shown) secured to face 63 and side rails 71. End rail 73 is provided with a cam block 77 having a curved end 79. Cam block 77 is positioned with its base in contact with the top of plunger rod 67.

Run-out table 69 is provided with a stop rail 81 which is bolted to said table at a position which will allow the desired length to be cut off the sheet metal material 17. Stop rail 81 has a face 83 facing shearing device 19. The run-out table may be supported on rollers on rails 25 or by a separate support table.

In FIGS. 1, 4, 7, 8 and 9, movable return table 87 runs on rollers 89 in the channel of the side rails 71 of run-out table 69. Return table 87 is provided with a stop rail 91 fixed to the upper ends of rods 92 which pass through holes in a cross rail 95 fixed to table 87. Rods 92 at their base carry a cross member 97 provided at each end with end cam rods 99, the cross member 97 being spring-loaded upwardly by means of springs between the said member and the enlarged bottom ends of rods 93 fixed to the cross rail 95. Behind stop rail 91 is provided a support rail 101. Cam blocks 103 having slanting rear ends 105 are secured to angle brackets (not shown) fixed to rails 25. At the centre of cross rail 95 is fitted an eye bolt 109 (FIG. 7) to secure return cable 111, which is also secured to carriage 23 by an eye bolt 112 after the cable has passed round pulley 114.

In FIGS. 1, 4, 5, 6, 8 and 9, can be seen a gripping device 113 provided on an extension table 115 secured to carriage 23. It comprises two hinged gripping arms 117 which are slidable in rib 18, that swivel on pin 119 in end supporting brackets 121 shown in broken lines in FIG. 5. The gripping arms 117 are positioned over a suitable slotted opening 123 in table 115 (FIG. 5), the supporting brackets 121 being of inverted U shape to straddle this opening. A cross rail 125 is secured to rails 25 and is provided with a cam arm 127 having a cylindrical end portion 129. Cam arm 127 is pivoted at its base on a pin 128 to a bracket 130 (the sides of which have been broken away in FIG. 5) and is provided with a spring 131 (FIGS. 1, 4, 5, 8 and 9). In FIG. 6 end portion 129 is shown inserted between the gripping arms 117 in their operative position in which centre rib 18 of sheet metal material 17 is securely held by the gripping arms.

In FIG. 1 is shown sheet metal material 17 as its front end 133 is about the contact the face 83 of stop rail 81. In this position carriage 23 cannot move as it is locked by plunger rod 67 being forced down by cam block 77 behind latch device 61. Stop rail 91 on return table 87 is shown in its retracted and non-operating position allowing sheet metal material 17 to freely pass over it. Stop rail 91 is in this figure held retracted by the action of cross member 97 as its end cam rods 99 engage under the slanting rear ends 105 of cam blocks 103. Gripping device 113 and cam arm 127 are shown in their non-operative position in which rib 18 of sheet metal material 17 freely slides over the gripping arms 117. In FIGS. 1 and 2, shearing device 19 has its cutter blade 31 in its non-operative position with cam rod 55 located in the top rear end of runway 37. The shoulder portion 57 of cam rod 55 bears on the inner face of cam end piece 47 so positioning rod 55 in runway 37.

In FIG. 4 sheet metal material 17 after contacting stop rail 81 has caused the run-out table 69 to move forward so extending side springs 75 (see FIG. 2) releasing rail 73 from contact with carriage 23 and thereby removing cam block 77 from holding down plunger rod 67. This action releases plunger rod 67 from engagement with latch device 61 so allowing carriage 23 to move forward. The carriage 23 is moved forward by the run-out table 69 as soon as this has completed its limited movement relatively to the carriage. At the same time cam rod 55 travels down in runway 37 so causing cutter blade 31 to descend and cut through sheet metal material 17 at the lowest point of the runway. Just prior to sheet metal material 17 being cut the end portion 129 of cam arm 127 enters between the gripping arms 117 of gripping device 113 opening the arms to friction grip the inside of rib 18. The gripping device operates until cam rod 55 completes its travel in runway 37, when the rib is released (see FIG. 8 where the end portion 129 is between the legs of the rear bracket 121). In this manner sheet metal material 17 is held tightly in die set 21 when the section is being cut and until the cutter blade 31 is fully retracted thus helping to ensure the making of a clean cut in the material and ensuring that the carriage 23 is moved its full distance forward.

As carriage 23 moves forward with sheet metal material 17 cable 111 is pulled which moves return table 87 in the opposite direction to the travel of sheet metal material 17, stop rail 91 being held down by the weight of sheet metal material 17 (see FIG. 4).

In FIG. 8 a length of sheet metal material 17 has been cut off and removed from the run-out table. Stop rail 91 of return table 87 is in its operative position and cam rod 55 has been projected laterally on to the horizontal runway 43 (see FIG. 2) by means of the ramp 40 leading to protuberance 39. In this process cam rod 55 has been caused to latch its shoulder 57 over and behind the spring loaded rail latch 49. Rod 55 is now free from runway 37, and holds and supports the top platen 51 of die set 21 above the sheet metal material 17.

In FIG. 9 the new front end of sheet metal material 17 as it continues to pass through die set 21 contacts stop rail 91 and moves return table 87 forward so returning the carriage 23 by means of cable 111 to its starting point with cam rod 55 operating on the horizontal runway 43 and shoulder 57 locating the cam rod behind rail 45. As the carriage 23 starts to move backwards, cam arm 127, being free to rotate counter-clockwise as seen in FIG. 9 against the tension of spring 131, is caused so to rotate, end portion 129 thus not entering between gripping arms 117 to a sufficient degree to cause the gripping arms to grip rib 18. Hence gripping arms 117 slide freely inside rib 18 during the return movement of carriage 23. Just prior to the completion of the return movement of carriage 23 shoulder 57 of cam rod 55 (see FIG. 2) contacts cam end piece 47 which slides the other end of the cam rod back into its first operating position in the top rear end of runway 37. At the same time stop rail 91 of return table 87 is retracted by engagement of cam rods 99 with cam blocks 103 as already described and shown in FIG. 1 and so comes once again below the level of sheet metal material 17.

Simultaneously cam block 77 depresses plunger rod 67 to latch behind latch device 61. In this manner carriage 23 is back in its stop position with sheet metal material 17 progressing along the run out table until it once again contacts stop rail 81.

The production cycle of operations, therefore, is that after a section has been cut off and removed from the run-out table the cutter blade 31 is at the end of its travel with cam rod 55 located over rails 45 of the horizontal runway 43. The gripping device 113 is also free from holding the section. Return movement of the shearing device is provided by the action of the new front edge of the sheet metal material 17 on stop rail 91 on the return table 87. Carriage 23 is thereafter held in position until the plunger rod 67 is released by the action of the sheet metal material pushing against stop rail 81 after the desired length has been run out of the roll forming machine.

By these means the shearing device is automatically moved forward and returned in cutting and non-cutting movements actuated solely by the movement of the sheet metal material.

For different profiles of sheet metal material and for ribbon, rod and tube it will be obvious that the cutter blades have to be made to the desired profile and the gripping device modified to the profile as required.

What I claim and desire to secure by Letters Patent is:

1. A flying shear for cutting into predetermined lengths material of the kind described comprising:
    shear blades between which the material is made to pass; a mounting for the shear blades which is forwardly movable with the material;
    engagement means connected with the shear blades mounting at a desired distance in front of the shear blades in the line of advance of the material so as to be engageable by the material and move forward the shear blades mounting leaving a predetermined length of material in front of the blades;
    cam means for causing the shear blades to close together in a cutting action as the shear blades mounting is moved forward including a cam element connected to one of the shear blades and an interacting cam element connected to a fixed part of the flying shear mechanism.

2. A flying shear according to claim 1 having cam means for opening the shear blades again after their closing movement during the forward movement of the shear blades.

3. A flying shear according to claim 2 having cam means for maintaining the shear blades in the open position during return movement.

4. A flying shear according to claim 1 having means for returning the shear blades mounting to its starting position after the forward movement, said means including a movable member disposed in the line of advance of the moving material, so as to be engageable therewith and moved thereby, said movable member being connected to the shear blades mounting.

5. A flying shear according to claim 4 wherein the movable member comprises a trolley, a part mounted on the trolley being engageable by the moving material, said trolley being connected to the shear blades mounting by means of a cable passing around a pulley so that as the trolley is moved forward by the material, the shear blades mounting is moved in its return direction.

6. A flying shear according to claim 4 wherein the said trolley part is spring loaded so as to take up an operative position in which it is engageable by the material and an inoperative position.

7. A flying shear according to claim 6 having camming means for moving the said trolley part out of engagement with the moving material as the shear blades mounting reaches is starting position.

8. A flying shear for cutting into predetermined lengths material of the kind described comprising:
    shear blades between which the material is made to pass;
    a mounting for the shear blades which is forwardly movable with the material;
    engagement means connected with the shear blades mounting at a desired distance in front of the shear blades in the line of advance of the material so as to be engageable by the material and move forward the shear blades mounting leaving a predetermined length of material in front of the blades;
    cam means for urging the shear blades to close together in a cutting action as the shear blades mounting is moved forward including:
    a first cam element connected to one of the shear blades and a first interacting fixed cam element;
    cam means for opening the shear blades again during the forward movement including:
    the said first cam element connected to the said one shear blade and a second interacting fixed cam element;
    cam means for maintaining the shear blades in the open position during return movement including:
    a second cam element connected to the said one shear blade and a third interacting fixed cam element.

9. A flying shear according to claim 8 wherein said first and second cam elements connected to said one shear blade and said first, second and third interacting fixed cam elements are provided at each end of said one shear blade.

10. A flying shear according to claim 8 wherein said first and second cam elements connected to said one shear blade are provided by surfaces of a cam rod slidably mounted on the said one shear blade to engage in turn said first, second and third interacting fixed cam elements.

11. A flying shear for cutting into predetermined lengths material of the kind described comprising:
    shear blades between which the material is made to pass arranged to form a die set;
    a mounting for the shear blades comprising a movable carriage arranged to move forward with the material and backward on rollers;
    engagement means for the moving material including a stop member mounted on the movable carriage against which a leading edge of the moving material comes into abutting engagement to move forward the shear blades mounting leaving a predetermined length of material in front of the blades;
    cam means for urging the shear blades to close together as the carriage is moved forward comprising a first cam element connected to one of the shear blades and a first interacting fixed cam element;
    cam means for causing the shear blades to open again during the forward movement comprising said first cam element connected to said one shear blade and a second interacting fixed cam element;
    cam means for maintaining the shear blades in the open position during return movement of the carriage comprising a second cam element connected to said one shear blade and a third interacting fixed cam element;
    a trolley mounted for forward movement with the material;
    engagement means provided on the trolley for engagement by the moving material;
    connecting means between the trolley and the movable carriage for returning the carriage to its starting position after the forward movement as the trolley is moved forward by the material engaging the engagement means of the trolley;
    means for disengaging the engagement means of the trolley from the sheet material as the carriage reaches its starting position.

12. A flying shear according to claim 11 wherein the engagement means provided on the movable carriage further includes a device mounted on the carriage for gripping the moving material and means for operating said device during the forward movement of the carriage at least as the moving material is cut and during subsequent forward movement of the carriage.

13. A flying shear according to claim 11 wherein the engagement means on the carriage further includes a device for gripping the moving material mounted on the carriage at a point behind the shear blades and means for operating said device while the moving material is cut and during the subsequent opening of the shear blades.

14. A flying shear according to claim 11 wherein the movable carriage carries a track on which the trolley is mounted for movement in a sense opposite to the movement of the carriage.

15. A flying shear according to claim 11 having locking means for retaining the movable carriage in its starting position and means for releasing said locking means when the moving material engages the engagement means provided on the movable carriage.

16. A flying shear according to claim 15 wherein the movable carriage comprises two parts resiliently interconnected so as to be able to separate by a short distant;
a plunger mounted on one of said parts;
cam means on the other of said parts engageable with a free end of the plunger;
a retaining latch engageable by the other end of the plunger to lock the movable carriage in its starting position;
spring loading means for the plunger urging the plunger away from the retaining latch and towards the cam means on the said other part of the movable carriage so that when the moving material engages the engagement means provided on the movable carriage, the two said parts of the carriage are displaced from one another and the cam means provided on the said other part is moved away from the free end of the plunger allowing the plunger to move out of engagement with the latch to unlock the carriage.

References Cited by the Examiner
UNITED STATES PATENTS

| | | | |
|---|---|---|---|
| 2,759,402 | 9/1956 | Jedlick | 83—318 X |
| 2,930,269 | 3/1960 | Kennedy | 83—318 X |
| 3,211,037 | 10/1965 | Diolot | 83—639 X |

WILLIAM S. LAWSON, *Primary Examiner.*

WILLIAM W. DYER, JR., *Examiner.*

F. T. YOST, *Assistant Examiner.*